United States Patent [19]
Stevenson

[11] Patent Number: 5,602,189
[45] Date of Patent: Feb. 11, 1997

[54] PROCESS FOR FORMING POLYISOCYANTATE-BASED FOAM AND PRODUCT FORMED THEREBY

[75] Inventor: Richard Stevenson, Mesa, Ariz.

[73] Assignee: Intercool Energy Corporation, Latham, N.Y.

[21] Appl. No.: 610,743

[22] Filed: Mar. 4, 1996

[51] Int. Cl.⁶ ................................................. C08G 18/00
[52] U.S. Cl. ................................................ 521/131; 521/155
[58] Field of Search ...................................... 521/131, 155

[56]  References Cited

U.S. PATENT DOCUMENTS

| | | |
|---|---|---|
| 4,927,863 | 5/1990 | Bartlett et al. . |
| 4,986,930 | 1/1991 | Lund et al. . |
| 4,996,242 | 2/1991 | Lin .......................................... 521/131 |
| 5,035,833 | 7/1991 | Ogawa et al. . |
| 5,089,534 | 2/1992 | Thoen ..................................... 521/131 |
| 5,114,986 | 5/1992 | Lin ......................................... 521/131 |
| 5,128,073 | 7/1992 | Allen et al. ............................... 521/57 |
| 5,286,759 | 2/1994 | Smits et al. . |
| 5,484,820 | 1/1996 | Mispreuvie et al. ..................... 521/137 |

FOREIGN PATENT DOCUMENTS

| | | |
|---|---|---|
| 0379268 | 1/1990 | European Pat. Off. . |
| 0421790 | 4/1991 | European Pat. Off. . |
| 1136982 | 5/1989 | Japan . |
| 9015169 | 12/1990 | WIPO . |
| 9508602 | 3/1995 | WIPO . |

*Primary Examiner*—Morton Foelak
*Attorney, Agent, or Firm*—Helfgott & Karas, PC.

[57]  ABSTRACT

A blowing agent for use in preparing a polyisocyanate-based foam which comprises a major portion of HCFC-123, a minor portion of HCFC-141b, and hexane and/or octane.

12 Claims, No Drawings

PROCESS FOR FORMING POLYISOCYANTATE-BASED FOAM AND PRODUCT FORMED THEREBY

FIELD OF THE INVENTION

This invention relates generally to foaming systems containing a blowing agent, and more particularly to the use of such a blowing agent in forming polyisocyanurate foams with a high index, e.g., 250 or more.

BACKGROUND OF THE INVENTION

A blowing agent is a composition, usually liquid at room temperature, which enters into a chemical reaction, here the reaction of a polyisocyanate and an isocyanate-reactive material, to create a rigid foam. The enclosed bubbles that comprise the foam contain carbon dioxide and constituents of the blowing agent in varying amounts. Yet the blowing agent is unchanged in its properties as a result of the chemical reaction; the blowing agent goes into solution as a liquid and comes out of solution as a gas during the exothermic reaction. In order to constitute a blowing agent, the material must be soluble in the constituents of the foam, but not so soluble that it destroys the polymeric linkages. It must also have a high boiling point for effective bubble formation.

For many years the blowing agents that became standard as most desirable in the preparation of isocyanate-based foams, such as rigid and flexible urethane and isocyanurate foams, were what became part of the vernacular as CFC's. Most typically, a composition identified as CFC-11 ($CCl_3F$) became a standard blowing agent. However, the use of this material is now banned by international treaty on the grounds that its release into the atmosphere damages the ozone layer in the stratosphere. As a consequence, this most standard blowing agent for forming isocyanate foams is now no longer available for use.

The result of the ban on CNC's led those of skill in the art to the utilization of related compositions. A solution was sought in the area of HCFC's, which are hydrogen-containing chlorofluoroalkanes. These HCFC's, and most particularly HCFC-123 ($CHCl_2CF_3$) and HCFC-141b ($CH_2ClCHClF$) have relatively short lifetimes in the atmosphere and tend to decompose before they reach the earth's stratosphere which contains the ozone layer. However, as set forth, for example, in U.S. Pat. No. 5,286,759, the art has considered HCFC's to have disadvantages when compared with CFC's, and those alleged disadvantages have led persons of skill in the art to seek other CFC substitutes. In U.S. Pat. No. 5,286,759, a blowing agent was disclosed comprising a mixture of a hydrocarbon with 4 or more carbon atoms and a polyfluorocarbon component with a specific boiling point and molecular weight ratio. Exemplary of such components are polyfluorocarbon compounds, for example, perfluorocyclohexane, polyfluoroalkanes and polyfluoroethers. Finally, this patent proposes a third component, which is stated to be halocarbons, ethers, ketones, etc.

While the art thus searches for more esoteric combinations of ingredients in order to meet the need created by the forced nonuse of CFC's, it is the purpose of the present invention to provide such a CFC substitute that is composed of a specific combination of HCFC's and a hydrocarbon such as hexane or octane. The combination of HCFC's that are included in the present invention are readily available and environmentally sound. When used in the proposed combinations, they have been found to constitute satisfactory, indeed more than satisfactory, blowing agents for isocyanate resins and create a good foam resistant to decomposition and flammability.

SUMMARY OF THE INVENTION

As my invention is more broadly defined, it constitutes a process for preparing a polyisocyanate-based foam that has reduced flammability and superior cell structure without the use of CFC's by reacting a polyisocyanate with an isocyanate-reactive material, all known in the art, together with a blowing agent. The blowing agent comprises a mixture having a major portion of what is identified by the shorthand designation, HCFC-123, a minor portion of HCFC-141b, and about 1 to 30 mole percent of a hydrocarbon selected from the group consisting of hexane and octane and isomers thereof. Generally, the percent of hydrocarbon used is less than 30 mole percent, e.g., 20 percent or, even more preferably, 10 percent.

With respect to the quantities of HCFC-123 used, another broad expression of the invention is that this compound is used in approximately 90 to 15 mole percent, and the HCFC-141b in about 75 to 5 mole percent. More specifically, the HCFC-123 is present in about 90 to 65 percent and the HCFC-141b in about 25 to 5 mole percent. The percentages of these two ingredients can vary. Most preferably, the HCFC-123 is present in about 75 percent and the HCFC-141b in about 15 mole percent, in which instance the hydrocarbon, which preferably is n-hexane, is present in about 10 mole percent.

The invention also takes the form of a polyisocyanate-based foam prepared in accordance with the process of my invention. It further takes the form of a blend of my blowing agent mixture together with an isocyanate-reactive material in water, which blend takes part in a reaction with a polyisocyanate. It is the composition of the blowing agent that distinguishes these isocyanate-reactive blends from those of the prior art.

DETAILED DESCRIPTION OF THE INVENTION

Since they form an important part of the present invention, the two HCFC's that are blended together with a hydrocarbon to form a blowing agent according to my invention will be defined more specifically. HCFC-123 is dichlorotrifluoroethane, i.e., $C_2HF_3Cl_2$. HCFC-141b is dichlorofluoroethane, ($C_2H_3FCl_2$). Of course, hexane is a saturated alkane with 6 carbon atoms, while octane is a saturated alkane with 8 carbon atoms. These two HCFC's, when used in proper proportions, together with hexane or octane or mixtures thereof, do not require any additional component to be used as a blowing agent mixture that is a satisfactory replacement for the banned CFC's. The mixture is satisfactory in and of itself, and the compounds for use in the mixture are readily and economically available.

As presently advised, the most preferred embodiment of my invention for a blowing agent is 75 mole percent of HCFC-123, 15 mole percent of HCFC-141b, and 10 mole percent of n-hexane. However, this mixture of compounds can vary, more particularly when considering the amount of flammability that is desired to be incorporated into the final product. Thus, it will be apparent that the flammability of the HCFC's is determined by the number of hydrogen atoms in the molecules. HCFC-123 contains one hydrogen atom, being doubly chlorinated and triply fluorinated. It is essentially non-flammable. On the contrary, HCFC-141b, being doubly chlorinated and only singly fluorinated, will have 3 hydrogen atoms, and thus be far more flammable than HCFC-123.

While both HCFC-123 and HCFC-141b are polar molecules and thus capable of serving as a solvent, the flammability of the mixture will vary in accordance with the percentages of the compounds used. Since it is desired that the resulting foam be substantially nonflammable, my preferred composition contains a major portion of HCFC-123 and a minor portion of HCFC-141b. Thus, while in one example a blowing agent can comprise 90 to 15 percent HCFC-123 and 75 to 5 percent HCFC-141b, all percentages being mole percents, it is preferred that the quantity of HCFC-123 predominates, e.g., that the HCFC-123 be 90 to 65 percent, or more preferably, 70 to 30 mole percent. Where flammability is not an issue, the HCFC-123 can be present in about 55 to 15 mole percent and the HCFC-141b present in about 75 to 35 mole percent.

With respect to the hydrocarbon that is used, I have found hexane and octane to be satisfactory, although hexane is preferred. While because of its availability, n-hexane is most preferred, isomers of hexane and octane are also satisfactory. Regarding the quantity of the hydrocarbon, i.e., hexane or octane, that is utilized, in its broadest range the hydrocarbon is present in from 1–30 percent. However, it is preferred that the quantity of hydrocarbon be a lesser percent, no greater than 20 mole percent, and in my most preferred embodiment of the present invention, the amount of n-hexane utilized is 10 mole percent.

As those of skill in this art are aware, a blowing agent such as that disclosed here is ordinarily mixed with the isocyanate-reactive compound, and the mixture reacted with a polyisocyanate to create the foam. Preferred reactive materials have an isocyanate-reactive hydrogen atom. Thus polyols, which have at least two hydroxyl groups per molecule are particularly preferred due to their reactivity. It is with this reactive material that the blowing agent of my invention is blended prior to the blend being reacted with the polyisocyanate. This preblend may also include water, surfactants and catalysts, the presence of which does not constitute part of the present invention and which are generally known to the art.

While a prime advantage of my blowing agent is the lack of ozone depletion that exemplifies CFC's, there are other advantages. For example, the present composition has the following advantages over the prior art characterized by HCFC-141b: it goes into solution much more easily; there is a smaller loss of blowing agent during the reaction; the blowing agent stays in solution at lower temperatures (40F); it is much more flame resistant; it has about 20% more yield for the same amount of blowing agent; it can use less catalyst and flame retardant; it can tolerate more water; it has much less shrinkage and better adhesion to the substrate; the cell structure is finer and more uniform; it has higher compressive strength and a lower K factor at equivalent densities; it has a tougher and smoother skin. Also, no surfactant is needed to avoid separation in solution. Further, it is non-flammable as a liquid and is EPA approved: ozone depletion potential 0.03 compared to 0.1 for HCFC-141b, and there is no delamination between passes of spray-applied foam.

It will be apparent to these of skill in this art that certain modifications and alterations can be made in this disclosure without departing from the spirit of the invention. For example, tolylenediisocyanate foams are also improved by use of the blowing agent of my invention, and where the blowing agent is used with polystyrene foams, HCFC-142b (1-chloro-1,1-difluoroethane) can be used as a substitute for HCFC-141b. As to all such changes, it is desired that they be included within the purview of the invention which is to be limited only by the scope, including equivalents, of the following, appended claims.

What is claimed is:

1. A process for preparing a polyisocyanate-based foam that has reduced flammability and superior cell structure without the use of CFC's, by reacting a polyisocyanate with an isocyanate-reactive material and a blowing agent, in which said blowing agent comprises a mixture of a major portion of HCFC-123, a minor portion of HCFC-141b, and about 1 to 30 mole percent of a hydrocarbon selected from the group consisting of hexane and octane and mixtures thereof.

2. A process as claimed in claim 1, in which said hydrocarbon is n-hexane and is present in about 1 to 20 mole percent.

3. A process as claimed in claim 2, in which said n-hexane is present in about 1 to 10 mole percent.

4. A process for preparing a polyisocyanate-based foam that has reduced flammability and superior cell structure without the use of CFC's, by reacting a polyisocyanate with an isocyanate-reactive material and blowing agent, in which said blowing agent comprises about 90 to 15 mole percent HCFC-123, about 75 to 5 mole percent HCFC-141b, and about 20 to 1 mole percent of a hydrocarbon selected from the group consisting of hexane and octane and mixtures thereof.

5. A process as claimed in claim 4, in which said HCFC-123 is present in about 90 to 65 mole percent and said HCFC-141b is present in about 20 to 5 mole percent.

6. A process as claimed in claim 4, in which said HCFC-123 is present in about 70 to 30 mole percent and said HCFC-141b is present in about 60 to 20 mole percent.

7. A process as claimed in claim 4, in which said HCFC-123 is present in about 55 to 15 mole percent and said HCFC-141b is present in about 75 to 35 mole percent.

8. A process as claimed in claim 4, in which said HCFC-123 is present in about 75 mole percent, said HCFC-141b is present in about 15 mole percent, and said hydrocarbon is n-hexane and is present in about 10 mole percent.

9. A composition comprising a blend of isocyanate-reactive material, water and a minor amount of a blowing agent, in which said blowing agent comprises a mixture of about 90 to 15 mole percent HCFC-123, about 75 to 5 mole percent HCFC-14b, and about 20 to 1 mole percent of a hydrocarbon selected from the group consisting of hexane and octane and mixtures thereof.

10. A composition as claimed in claim 9, in which said blowing agent comprises about 90 to 65 mole percent HCFC-123, and about 25 to 5 mole percent HCFC-141b.

11. A process as claimed in claim 9, in which said HCFC-123 is present in about 55 to 15 mole percent and said HCFC-141b is present in about 75 to 35 mole percent.

12. A composition as claimed in claim 9, in which said HCFC-123 is present in about 75 mole percent, said HCFC-141b is present in about 15 mole percent, and said hydrocarbon is n-hexane and is present in about 10 mole percent.

* * * * *